No. 780,973. PATENTED JAN. 31, 1905.
G. H. CAMPBELL.
MOLDING MACHINE.
APPLICATION FILED AUG. 5, 1903.

Witnesses.
L. M. Sangster.
Geo. A. Neubauer.

Inventor.
George H. Campbell.
By A. J. Sangster
Attorney.

No. 780,973. PATENTED JAN. 31, 1905.
G. H. CAMPBELL.
MOLDING MACHINE.
APPLICATION FILED AUG. 5, 1903.

Witnesses.
L. M. Sangster.
Geo. A. Neubauer.

Inventor.
George H. Campbell.
By A. J. Sangster
Attorney.

No. 780,973. PATENTED JAN. 31, 1905.
G. H. CAMPBELL.
MOLDING MACHINE.
APPLICATION FILED AUG. 5, 1903.

Witnesses.
L. M. Sangster
Feo. A. Neubauer

Inventor,
George H. Campbell.
By
W. J. Sangster
Attorney.

No. 780,973. PATENTED JAN. 31, 1905.
G. H. CAMPBELL.
MOLDING MACHINE.
APPLICATION FILED AUG. 5, 1903.

Witnesses.
L. M. Sangster
Geo. A. Neubauer

Inventor.
George H. Campbell.
By A. J. Sangster
Attorney.

No. 780,973. Patented January 31, 1905.

UNITED STATES PATENT OFFICE.

GEORGE H. CAMPBELL, OF TORONTO, CANADA, ASSIGNOR TO HIMSELF, F. B. SHEPARD, OF NEW YORK, N. Y., AND E. G. RUSSELL, OF BUFFALO, NEW YORK.

MOLDING-MACHINE.

SPECIFICATION forming part of Letters Patent No. 780,973, dated January 31, 1905.

Application filed August 5, 1903. Serial No. 168,286.

*To all whom it may concern:*

Be it known that I, GEORGE H. CAMPBELL, a subject of the King of Great Britain, residing at Toronto, in the county of York, Province of Ontario, and Dominion of Canada, have invented certain new and useful Improvements in Molding-Machines, of which the following is a specification.

This invention relates to an improved machine for making that class of molds used in producing metal castings.

One of the particular features of this invention has reference to a cylinder or wheel having a wide thread or periphery which constitutes a support for a plurality of flasks and patterns.

Other features have reference to a swinging false flask or sand-box and a preliminary sand-pressing mechanism which carries means for lifting and dropping the swinging false flask, to an improved form of ramming mechanism, to a novel scraping mechanism for removing the sand from the top of the flask, and to mechanism for lifting the completed mold from the pattern. The invention, however, is not to be considered as limited to the mechanism above stated, as the order of operating upon flasks might be changed or varied or some of the mechanisms might be altogether omitted without rendering the machine inoperative.

The main objects of the invention are to simplify the construction of this class of machines and to render the same more compact and efficient in operation.

The invention also relates to certain details of construction, all of which will be fully and clearly hereinafter described and claimed, reference being had to the accompanying drawings, in which—

Fig. 7 is a central vertical section through the machine on line $b\,b$, Fig. 1.

Referring to the drawings for the details of construction, like numerals designate like parts.

In describing this machine I will first take up and describe the construction of the machine-frame, then the flask-supporting mechanism, the sand-delivery mechanism, the false-flask mechanism, the preliminary sand-pressing mechanism, the finishing sand-pressing mechanism, the scraping mechanism for removing the superfluous sand, the mechanism for lifting the completed mold from the pattern, means for intermittently rotating the flask-supporting mechanism, and finally set forth the manner in which the machine is operated. However, I wish it understood that I do not confine myself to the employment of all of the above mechanisms in my improved machine, as some may be dispensed with without materially affecting the operation—for instance, the completed molds might be lifted off by hand, dispensing with the lifting mechanism.

Figure 5:
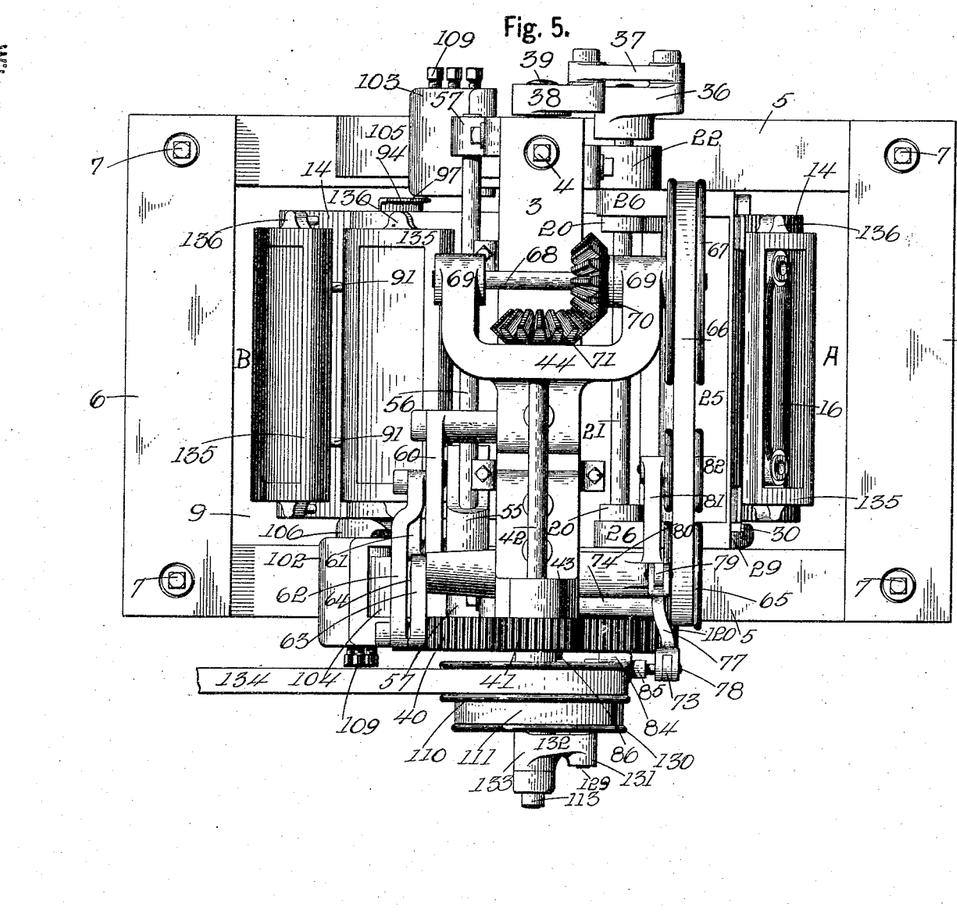
Fig. 5 is a top plan view of the machine.
Figure 6:
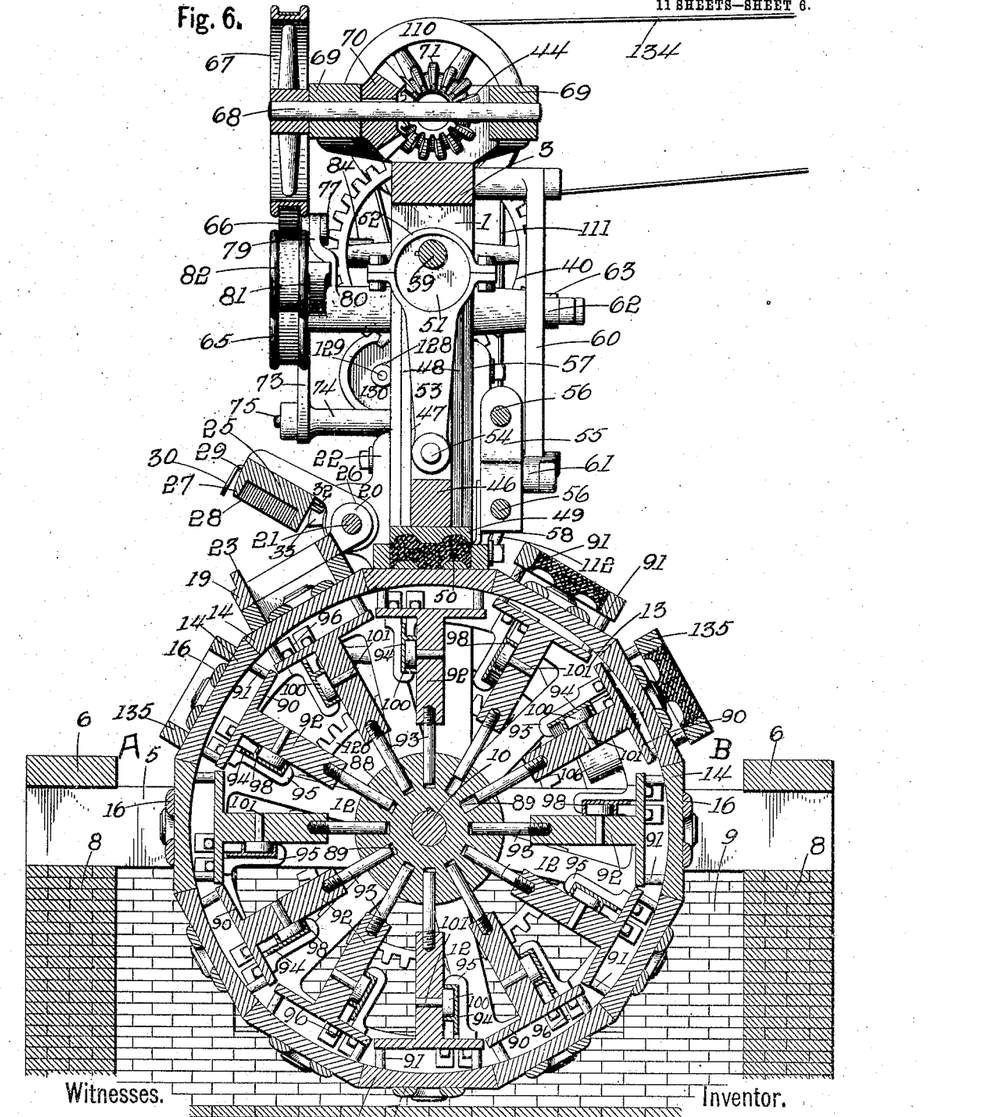
Fig. 6 is a central vertical section through the machine on line $a\,a$, Fig. 3.

*Machine-frame.*—The machine-frame in the preferred type of machine shown in the drawings consists of two vertical side members 1 and 2 and a horizontal top member bolted upon the upper ends of the vertical side members by bolts 4. The side members are mounted upon a base formed of four horizontal beams 5 and 6, which are secured together by bolts 7 (see Fig. 5) and supported upon a foundation 8, preferably built of brick, with a deep depression or recess 9, for a purpose hereinafter set forth.

For a clear understanding of the preferred form of frame reference is to be had particularly to Figs. 1, 2, 3, 4, 5, 6, and 7.

*Flask-supporting mechanism.*—The flask-supporting mechanism consists of a cylinder or wheel having a comparatively broad or wide tread or periphery upon which the patterns and flasks are supported. The cylinder or wheel is preferably rotatably supported by the base of the machine-frame, and the brick foundation 8 is recessed, as before described, so that the cylinder or wheel when in position will be partially above and partially below the floor. A horizontal shaft 10 is journaled in the side beams 5 of the base, and two hubs 11 are keyed or otherwise rigidly secured to said shaft, from each of which a series of spokes 12 radiate to outer rims or rings 13. The rims 13 are separated sufficiently to provide a comparatively wide tread or periphery which is formed of a series of segmental block-plates 14, arranged in edge-to-edge position around the circumference of the rims or rings 13, the block-plates extending from the rims or rings, with their ends secured above the peripheral surface of the rims or rings by screws 15 or other fastening means. The outer surface of each of the block-plates 14 is flat to afford a plane surface upon which the pattern and flask is supported, and the under surface is curved to correspond to the curved peripheral surface of the rims or rings. (See Figs. 1, 2, and 6.) The edges of the blocks are also beveled, so that they will contact throughout when in position. (See principally Fig. 8.) To indicate the manner in which a pattern is placed upon these blocks, the pattern of a radiator-section is shown in position on some of the figures, being indicated by the numeral 16 in Figs. 1, 2, 3, 4, 5, 6, 7, and 8.

Figure 1:
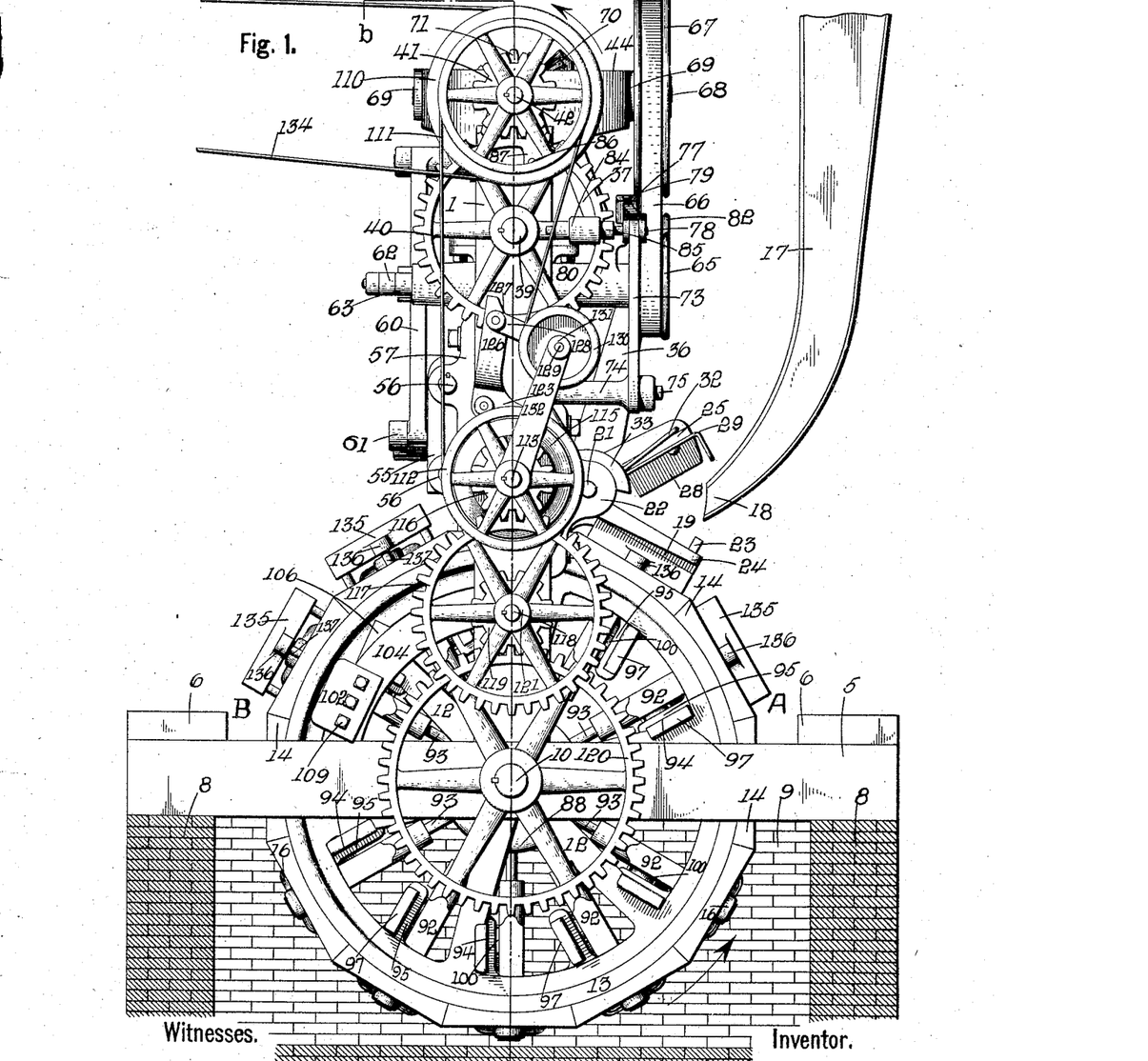
Figure 1 is a side elevation of the machine looking in the direction of the arrow V, Fig. 3.
Figure 2:
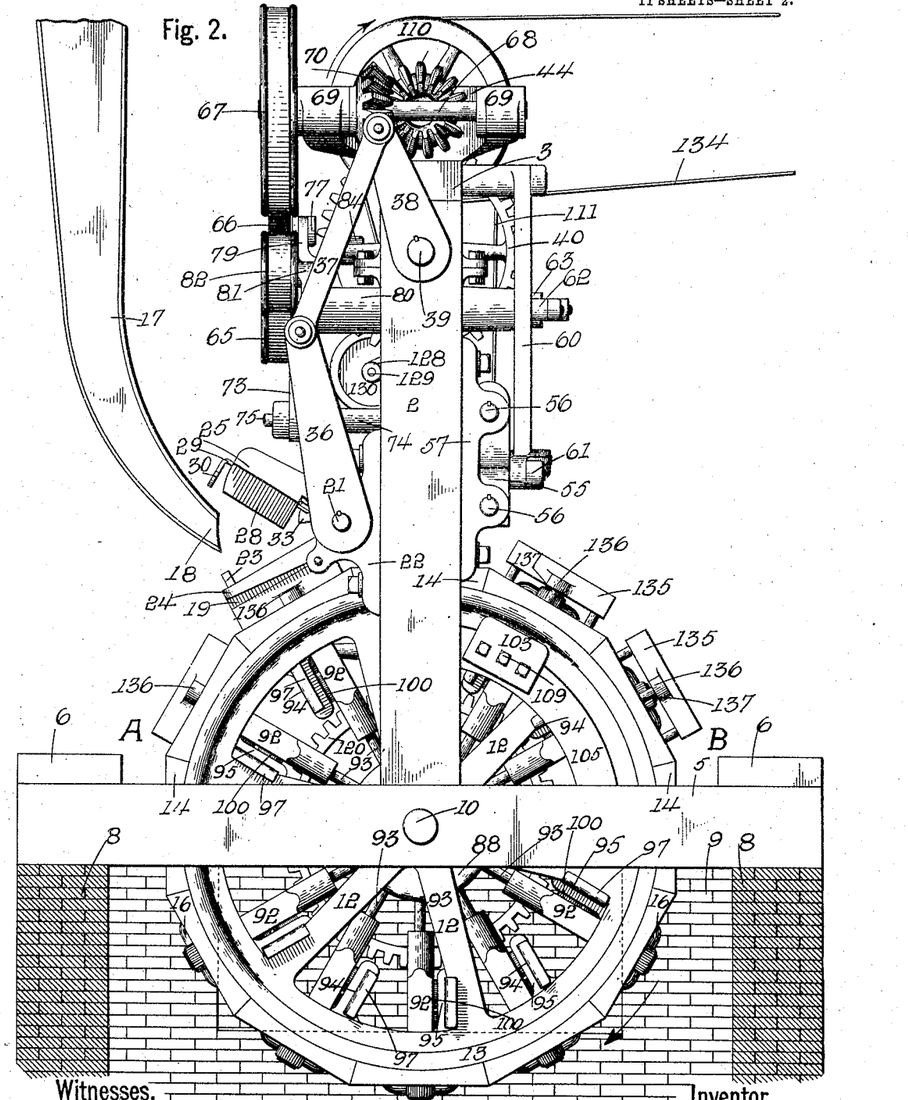
Fig. 2 is a side elevation of the machine looking in a direction opposite to the arrow V, Fig. 3.

*Sand-delivery mechanism.*—The sand-delivery mechanism preferably employed consists of a tapering spout 17, which curves at its lower end, substantially as shown at 18 in Figs. 1 and 2, to direct the sand into the flask without interfering with the action of other mechanisms, as will be more specifically pointed out farther on.

*False-flask mechanism.*—The false flask or sand-box is arranged to swing down upon a flask when in position to receive sand and is lifted therefrom by the preliminary sand-pressing mechanism after the sand is preliminarily pressed into the flask, as will be specifically hereinafter explained.

Figures 17, 18, 19, 20, 21:
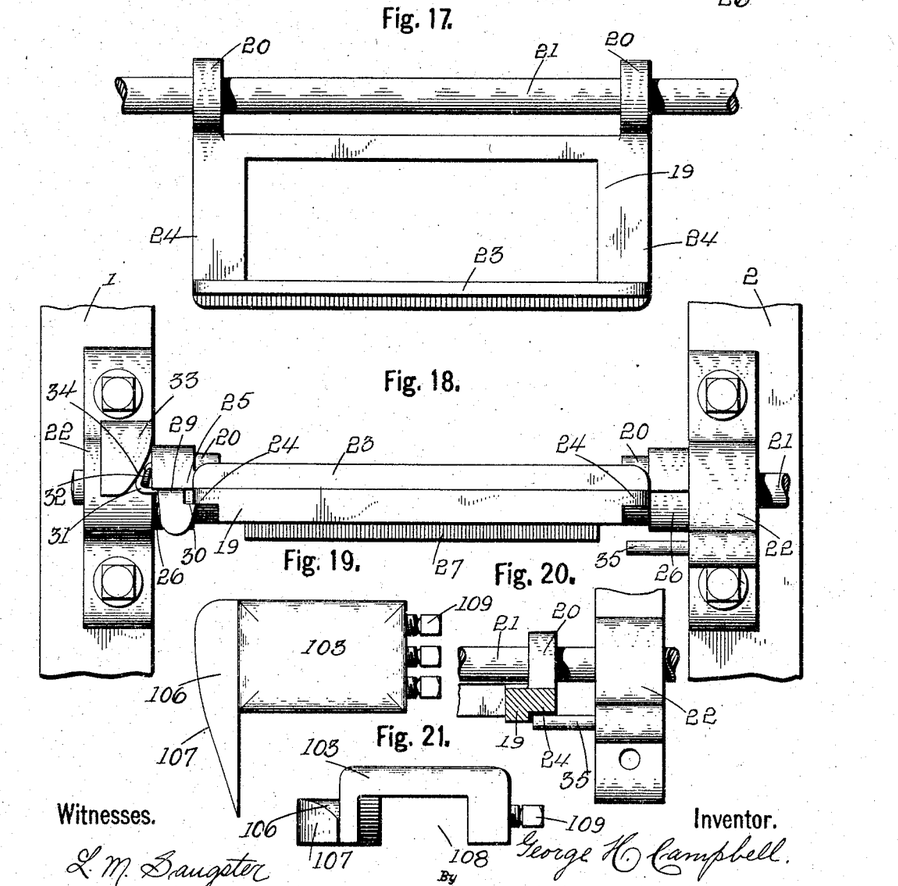
Fig. 17 is an enlarged detached top plan view of the swinging false flask or sand-box.
Fig. 18 is an enlarged fragmentary view of the frame, showing a front view of the pressing mechanism and swinging sand-box.
Fig. 19 is an enlarged detached plan view of one of the cam-blocks for operating the cam slide-plates.
Fig. 20 is an enlarged fragmentary section through the swinging false flask or sand-box, also showing a fragment of the supporting-shaft and its bearing and the bar for supporting the swinging false flask or sand-box.
Fig. 21 is a front view of the cam-block shown in Fig. 19.

The false flask or sand-box consists of a rectangular-shaped frame 19, having two projecting ears 20 extending inwardly from the inner corners, as shown in Fig. 17. These ears are provided with central openings, through which a shaft 21 loosely passes, so that the false flask swings loose on the shaft. The shaft 21 is supported in horizontal position by having its ends journaled in openings in blocks 22, bolted or otherwise secured to the side members 1 and 2 of the machine-frame.

The false flask or sand-box corresponds in size and form to the flask employed, so that when arranged above a flask it practically forms an upper continuation of the flask and provides sufficient space to receive the required quantity of loose sand to form a mold. The false flask is provided with an upwardly-extending flange 23 on its top surface and an outwardly-extending flange 24 on each end, (see Figs. 1, 2, 3, 8, 17, 18, and 20,) the purpose of which will be more fully described farther on.

The false flask is elevated by mechanism to be hereinafter described and drops into position above a flask by gravity.

Figure 8:
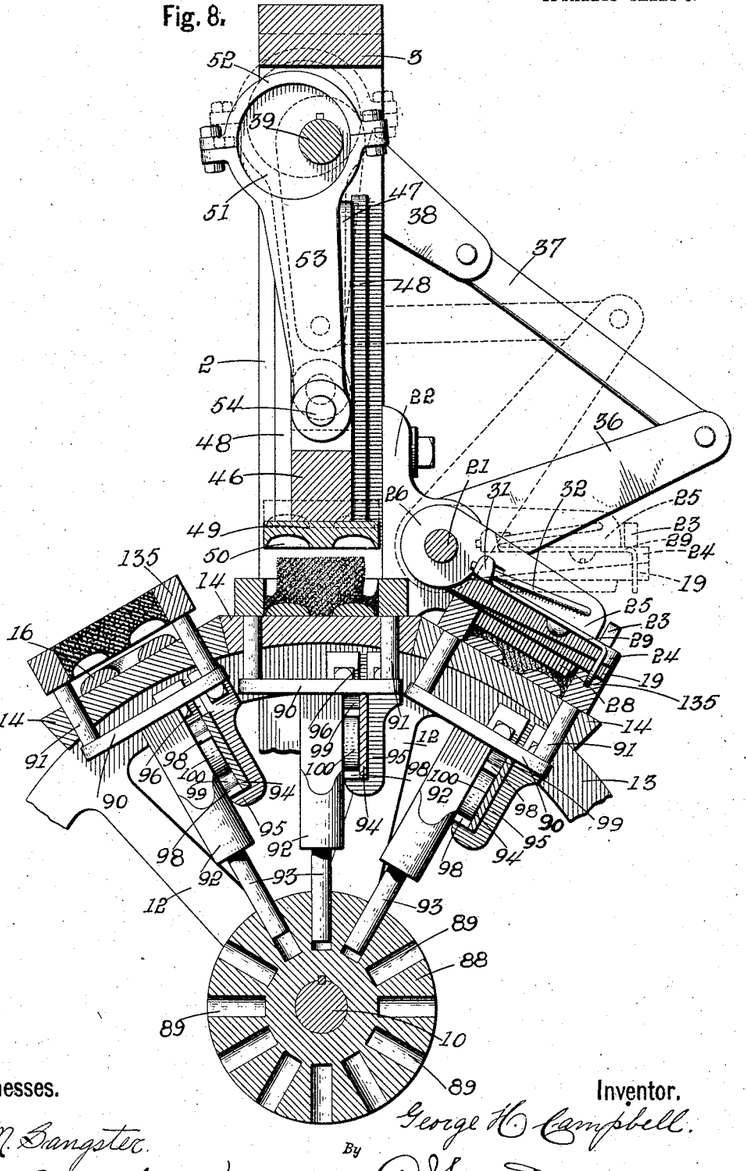
Fig. 8 is an enlarged fragmentary section through the machine on line $c\,c$, Fig. 3, the ramming and pressing mechanism being shown in one position in full lines and in another position in dotted lines.

*Preliminary sand-pressing mechanism.*— The preliminary pressing mechanism consists of a platen 25, which is provided with lateral ears 26, having openings through which the rock-shaft 21 passes. The platen 25 is rigidly keyed to the shaft and provided on its under surface with a series of downwardly-extending side flanges 27 and end flanges 28, arranged in the form of a rectangle and sufficiently smaller than the false flask to fit within said flask. The purpose of the rectangularly-arranged flanges is to firmly press and condense that portion of the sand adjacent to the interior of the sides and ends of the flask, substantially as shown in Fig. 8. The sand is sufficiently pressed by the preliminary sand-pressing mechanism to permit the false flask to be lifted therefrom when the platen is elevated after pressing the sand without spilling any of the sand.

The outer surface of the outer flange 27 of the platen 25 is curved so as to fit closely against the inner surface of the false flask 19, and thereby press or condense the sand adjacent to the inner side of the flask. (See Figs. 1 and 8.)

Figure 3:
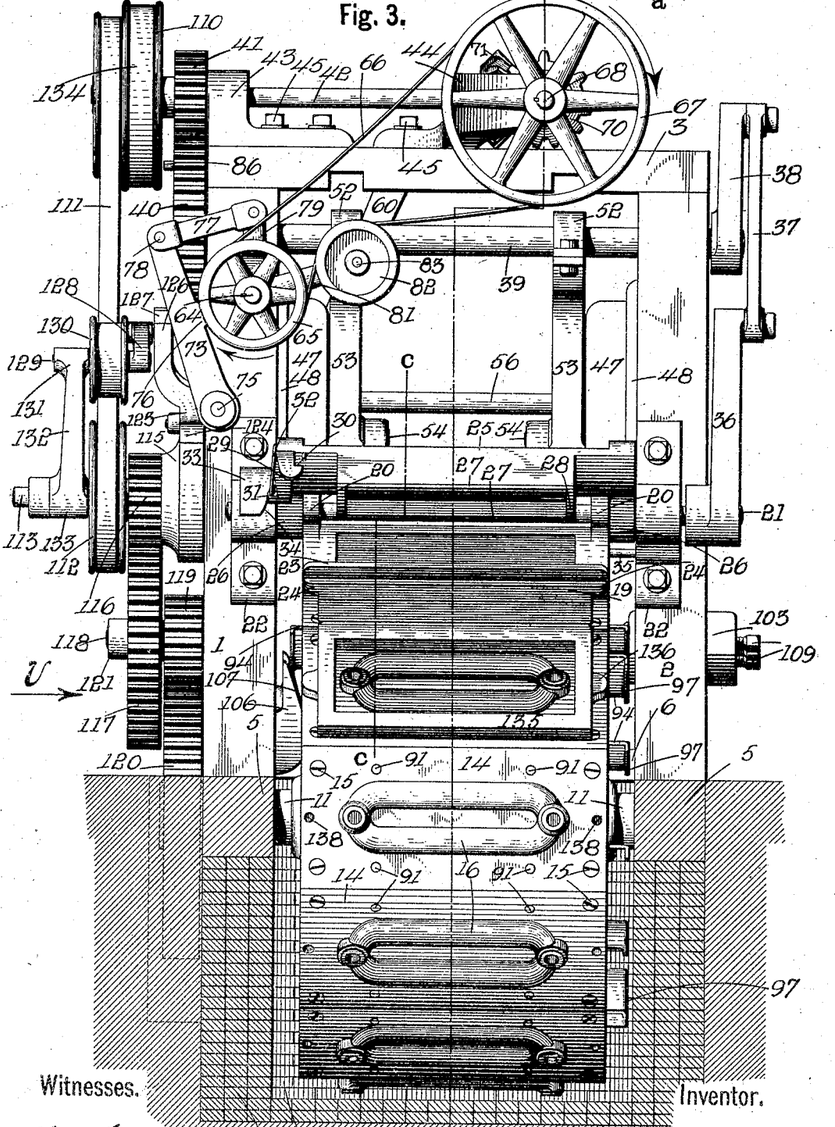
Fig. 3 is a front elevation of the machine.

A latching device is mounted upon one end of the platen 25, the purpose of which is to temporarily lock the false flask 19 to the platen 25, so that when the platen is elevated after the operation of preliminarily pressing the sand in the flask has been completed the false flask will be lifted with it. This latching device is illustrated in Figs. 1, 3, 16, and 18 and comprises a plate 29, pivoted to the bottom surface of the platen 25 and near one end thereof by a screw and having its outer end bent downward substantially at right angles thereto and cut away to form a hook 30 to catch over the edge of the false flask, as shown in Figs. 1, 2, and 3 and particularly Fig. 18. The inner end of the plate 29 is provided with a lateral lug 31, which extends from the side of the plate and bends diagonally upward and inward, and a spring-bar 32, having its outer end fastened to the end of the platen 25, has its inner end engaging in the curved angle of the lug 31 on the plate 29. The tendency of the spring-bar 32 is to force the inner end of the plate 29 outward and keep the outer end of the plate in latching position in respect to the false flask 19. As the platen 25 is being moved into its lowest position the hook 30 on the outer end of the plate 29 springs over the edge and catches upon the under surface of the end flange 24 of the false flask 19, thereby locking the false flask to the platen, and as the platen 25 is lifted upward the false flask 19 is carried with it until the intermittently-rotating wheel carrying the patterns has made a partial rotation and carried the flask which has been operated upon by the preliminary sand-pressing mechanism one step forward, when the false flask 19 is released and drops by gravity into position for another charge of sand. The means for releasing the latching device consists of a portion 33, formed integral with one of the bearing-blocks 22 and having its inner face cut away and curved downwardly and outwardly, as shown at 34 in Figs. 3 and 18. When the platen 25 and false flask 19 are lifted upwardly, the lug 31 upon the inner end of the plate 29 slides upon the curved inner surface of the portion 33 and gradually presses the inner end of the plate 29 inwardly, turning the plate on its pivot until the hook 30 on the outer end of the plate 29 is released from the flange 24 of the false flask 19, when the false flask drops by gravity into position above the next succeeding flask on the flask-supporting wheel.

A means is provided for supporting the false flask 19 when in its lowest position and consists of a bar 35, which extends inwardly from one of the bearing-blocks 22 and upon the inner end of which the flange 24, extending from the adjacent end of the false flask 19, is adapted to rest.

The mechanism for operating the rock-shaft 21, upon which the preliminary sand-pressing mechanism is mounted, is illustrated in Figs. 2, 3, 4, 5, and 8. This mechanism consists of a crank 36, rigidly keyed to one end of the shaft 21, the outer end of the crank 36 being connected by a connecting-link 37 to a crank 38. The crank 38 is keyed or otherwise fastened to one end of the horizontally-extending shaft 39, which is rotatably mounted in the upper portions of the side frame members 1 and 2. The horizontal shaft 39 is rotated by means of a gear-wheel 40, which meshes with a pinion 41 on a horizontal driving-shaft 42. The horizontal driving-shaft 42 is journaled in bearing-blocks 43 and 44, which extend above and are bolted to the top frame member 3 by bolts 45. (See Figs. 3, 4, 5, and 7.) The crank 36 is made sufficiently longer than the crank 38 so that a rotating motion of the crank 38 will transmit a rocking movement to the rock-shaft 21.

*Finishing sand-pressing mechanism.*—After the sand in the flask has been preliminarily pressed the flask is carried beneath the finishing sand-pressing mechanism, which is illustrated in Figs. 3, 4, 6, 7, and 8. This mechanism consists of a cross-head comprising a horizontal portion 46 and two vertical end portions 47, slidably mounted between slideways 48, secured to the inner surface of the side frame members 1 and 2, and a platen 49, which is fastened to the bottom surface of the horizontal portion 46 of the cross-head in any well-known manner. The platen 49 has its bottom surface cut out —as, for instance, as shown at 50 in Figs. 6 and 8—to conform to the shape of the pattern, and thus enable the sand to be equally pressed between two surfaces of irregular shape but similar conformation. The cross-head is given a vertical reciprocating movement by means of a plurality of eccentrics 51, preferably two in number, which are mounted upon the horizontal shaft 39. Collars 52 loosely encircle the eccentrics 51 and are provided with depending arms 53, and the lower ends of these depending arms 53 are pivoted to the inner surface of the vertical end portion 47 of the cross-head, near the lower end thereof, by pins 54.

Figures 22, 23, 24, 25, 26, 27:
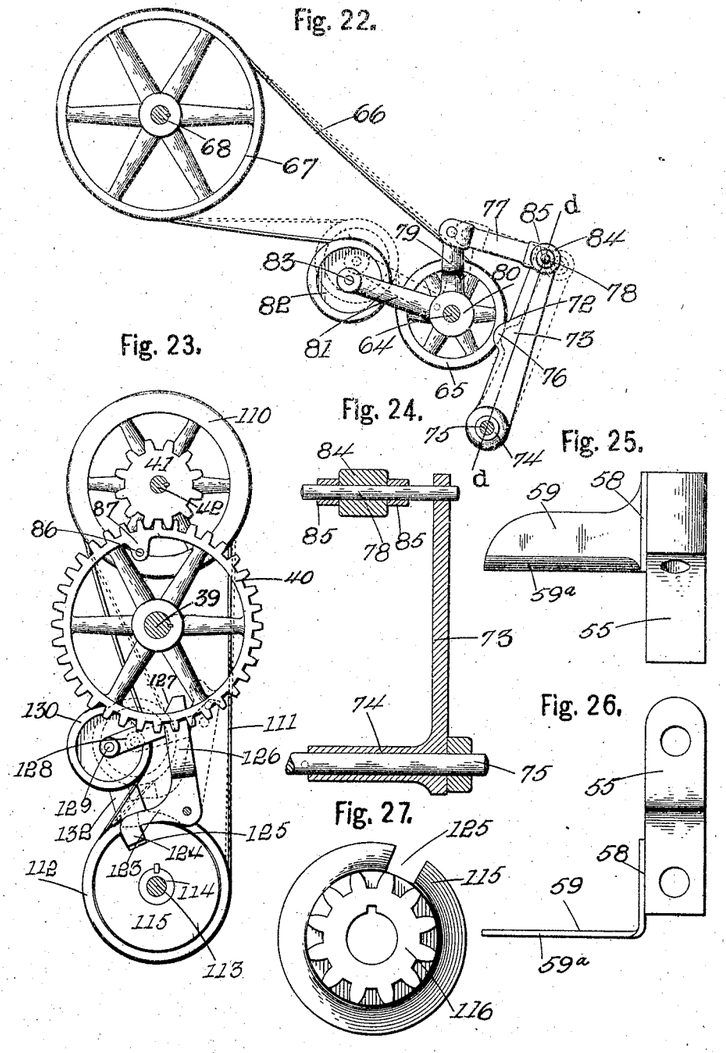
Fig. 22 is a detached rear view of the mechanism for tightening the belt for operating the sand-scraping device, the belt being shown in its loose position in full lines and in taut driving position in dotted lines, and the pivotal operating-arm and its coöperating parts are likewise shown in two positions in dotted and full lines.
Fig. 23 is a detached side view of the mechanism for tightening the belt for operating the revolving cylinder, the belt being shown in its loose position in full lines and in taut driving position in dotted lines and the angular cam-locking crank being shown in two positions in dotted and full lines.
Fig. 24 is an enlarged fragmentary section on line d d, Fig. 22, through the pivotal operating-arm and its coöperating parts.
Fig. 25 is an enlarged detached plan view of the cross-head carrying the sand-scraper.
Fig. 26 is an enlarged detached end view of the cross-head carrying the sand-scraper.
Fig. 27 is an enlarged detached side view of the gear and cam-wheel.

*Sand-scraping mechanism.*—When the sand has been pressed by means of the mechanism above described, the superfluous sand is removed by means of a scraping device illustrated in Figs. 1, 4, 6, and 7, which moves horizontally across the top of the flask from end to end of said flask. This scraping device consists of a slide-block 55, slidably mounted upon two horizontally-extending rods 56, mounted in blocks 57, which are bolted or otherwise fastened to the rear of the side frame members 1 and 2. A plate 58, having a horizontal portion 59, is secured to the inner face of the sliding block 55 in any well-known manner. The horizontally-extending portion 59 of the plate 58 has one edge beveled to form a knife-edge 59$^a$. (See Figs. 25 and 26, so as to scrape the sand evenly from the top of the flask. The block 55 is given a reciprocating lateral sliding movement upon the rods 56 by means of a swinging arm 60, pivoted at its upper end to the horizontal top frame member 3. The lower end of the swinging arm 60 is connected to one end of a crank-arm 61, the opposite end of which is pivoted to the slide-block 55 by a pin. The swinging arm 60 is operated by means of a connecting-rod 62, pivoted at one end to the swinging arm 60 and at its other end to a crank 63, which is rigidly keyed or otherwise secured to the rear end of a short transversely-extending horizontal shaft 64, journaled in the side frame member 1. The opposite or front end of the shaft 64 has a flanged pulley 65 keyed thereto, and a belt 66 connects the pulley 65 with a pulley 67, mounted upon one end of an upper transverse shaft 68. The shaft 68 is journaled in bearings 69 on the bearing-block 44, which is U-shaped, as shown in Figs. 1, 2, 3, 4, 5, and 6, and the shaft 68 is rotated by means of a bevel gear-wheel 70, mounted upon the shaft 68, which meshes with a similar bevel gear-wheel 71, mounted upon the end of the driving-shaft 42. (See Fig. 5.) One of the flanges of the pulley 65 is provided with a peripheral depression or notch 72, and a bar 73, extending diagonally upward from a sleeve 74, which is loosely mounted on a pin 75, extending from the front of the side frame member 1, is provided with a lug or lateral extension 76, which fits in the depression 72 in the flange of the pulley 65. A connecting-rod 77 is pivoted at one end to the upper end of the bar 73 by a long pin 78 and at its opposite end to the upper end of a crank-arm 79. The crank-arm 79 extends upwardly from a sleeve 80, which is loosely mounted upon the shaft 64 and adjacent to the pulley 65. A crank-arm 81 extends from the sleeve 80 approximately at right angles to the crank-arm 79 and has a small flanged pulley 82, over which the lower portion of the belt 66 passes, pivoted to its outer end by a pin 83. To distinguish the sleeve 80 from the other sleeves, I will hereinafter term it the "crank-sleeve."

The pin 78, which pivots the connecting-rod 77 to the bar 73, extends rearwardly across the gear-wheel 40 and serves as a shaft upon which a roller 84 is loosely mounted, the roller 84 being held in position by collars 85, which are fastened in position upon the pin 78 on each side of the roller 84. (See Figs. 1, 4, 5, 22, and 24.)

The bar 73 is rocked by means of a pin 86, extending outwardly from a lug 87, extending inwardly from the rear of the gear-wheel 40. The pin 86 strikes the roller 84 and forces it outward, thereby rocking the bar 73 upon its pivoting-pin 75 and withdrawing the lug or extension 76 from the depression 72 in the flange of the pulley 65. The crank-sleeve 80 is rocked by means of the connecting-rod 77 and crank-arm 79, the rocking of the crank-sleeve 80 lifting the pulley 82 upwardly and tightening the belt 66, thus causing the shaft 64 to revolve.

The object of the lug 76 and depression 72 is to keep the bar 73 in its outward position after the pin 86 has passed the roller 81, the lug 76 sliding upon the flange of the pulley 65 as the pulley revolves, and also to prevent the pulley 65 from making more than one complete revolution.

*Lifting mechanism.*—When the finishing sand-pressing operation has been performed and the sand-scraper has removed the superfluous sand from the top of the flask, the flask is carried one step farther and lifted off the pattern. The mechanism for lifting the flask from the pattern is illustrated in Figs. 1, 2, 6, 7, 8, and 9, particularly Figs. 8 and 9. A central hub 88 is rigidly keyed to the shaft 10 midway between the hubs 11 and is provided with a series of radial sockets 89, which correspond in number to the number of patterns. A series of substantially rectangular plates 90, which correspond to the number of sockets 89, are each arranged approximately parallel to and beneath one of the plates 14 and provided with a plurality of pins 91, projecting from the outer surface, which loosely pass through openings in the plates 14. (See Figs. 3, 4, and 8.) These pins are preferably four in number, and each extends from one corner of the rectangular plates 90. A block 92, preferably formed integral with each of the plates 90, extends inwardly from the inner face of the plate toward the shaft 10, and a bar 93, having one end screwed into the end of the block 92, has its other end seated in one of the sockets or depressions 89, which form guides in which the bar 93 slides. A series of sliding cam-plates 94 are arranged around the inner periphery of the rims 13 of the intermittently-rotating wheel and are slidably supported in blocks 95, bolted to the inside of the rims 13 and each of which is provided with a long narrow depression 96, in which one end of the sliding cam-plate 94 fits. These sliding cam-plates 94 correspond in number to the plates 90 and are each arranged beneath one of the plates 90 and near one face of the block 92. The sliding cam-plates 94 are preferably formed as shown in Figs. 8, 9, 10, 11, and 13, and each consists of a long narrow plate having its ends 97 bent upwardly substantially at right angles and provided on its lower surface with two downwardly-extending angular flanges, which extend parallel to each other and constitute two parallel cam parts. These flanges are formed as shown in Figs. 9, 10, 11, and 13, and each consists of two straight portions 98, which extend parallel to the side edges of the plates 94 and are connected by an intermediate diagonally-extending portion 99. A roller 100 is pivoted to that face of each of the blocks 92 which is adjacent to the sliding cam-plates 94 by a pin 101, so that the roller 100 fits between the flanges 98 of the cam-plates 94.

Figure 9:
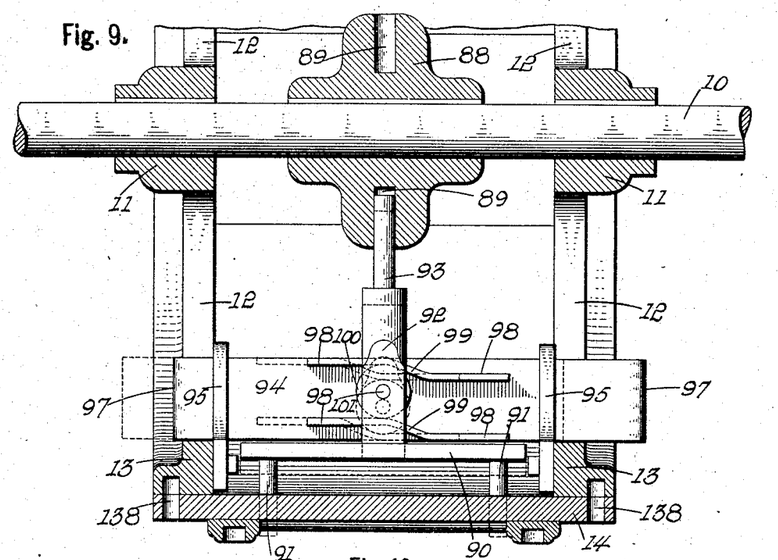
Fig. 9 is an enlarged fragmentary section through the revolving cylinder or wheel, showing one of the devices for lifting the completed mold from the pattern in normal inoperative position in full lines and moved outwardly into operative position in dotted lines.
Figure 10:
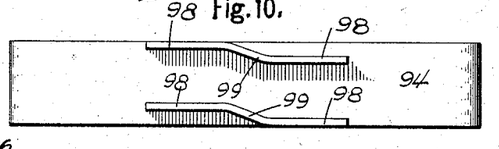
Fig. 10 is an enlarged detached face view of one of the cam slide-plates.
Figure 11:
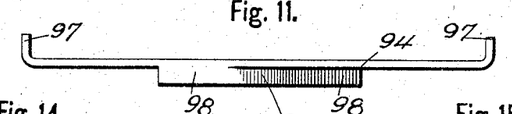
Fig. 11 is an enlarged detached side or edge view of one of the cam slide-plates.
Figure 12:
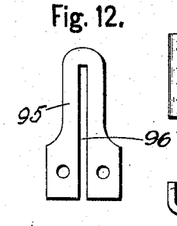
Fig. 12 is an enlarged detached side view of one of the U-shaped guide-blocks for guiding the cam slide-plates.
Figure 13:
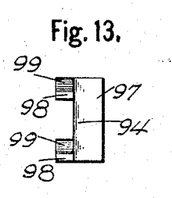
Fig. 13 is an enlarged detached end view of one of the cam slide-plates.
Figure 14:
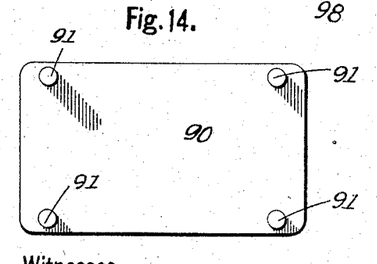
Fig. 14 is an enlarged detached outside view of the plate carrying the pins for lifting the completed mold from the pattern.
Figure 15:
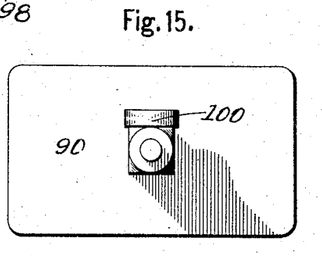
Fig. 15 is an enlarged detached inside view of the plate shown in Fig. 14.
Figure 16:
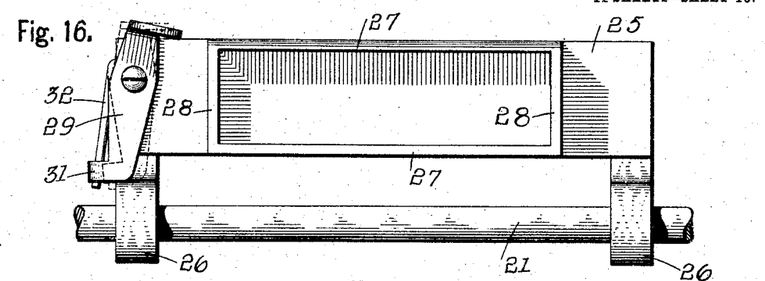
Fig. 16 is an enlarged detached bottom view of the sand-pressing mechanism, the latch being shown in locked position in full lines and in unlocked position in dotted lines.

It will be seen from the foregoing description and drawings that when the cam-plate 94 is moved from the position shown in full lines in Fig. 9 to the position shown in dotted lines in the same figure the roller 100 will be moved, as shown, by the flanges 98, which form the parallel cam sides of a cam-slot in which the roller 100 operates. The movement of the roller 100 carries with it the block 92 and plate 90 and lifts the flask from the pattern by means of the pins 91, which as they rise come in contact with the lower edge of the flask resting upon the plate 14. (See Fig. 8.)

The sliding cam-plates 94 are operated by two cam-blocks 102 and 103, formed substantially as shown in Figs. 1, 3, 4, 5, 7, 19, and 21, and which are adjustably mounted upon curved frame members 104 and 105. The frame-piece 104 connects the frame member 1 and one of the frame members 5, and the frame member 105 connects the frame member 2 and one of the frame members 5. (See Figs. 1, 2, 4, and 5.) The cam-blocks 102 and 103 are each provided with an extension 106, having its outer face curved or beveled, as shown at 107 in Figs. 3, 4, 7, 19, and 21, upon which the bent ends 97 of the cam-plates 94 slide. The cam-blocks 102 and 103 are each provided with a depression 108 (see Fig. 21) in its bottom surface, so as to fit over the top of the curved frame members 104 and 105. The cam-blocks 101 and 102 are adjustably mounted upon the curved frame members 104 and 105 and are locked in their adjusted position by set-screws 109, screwed through the outer depending portion of the cam-blocks.

Figure 4:
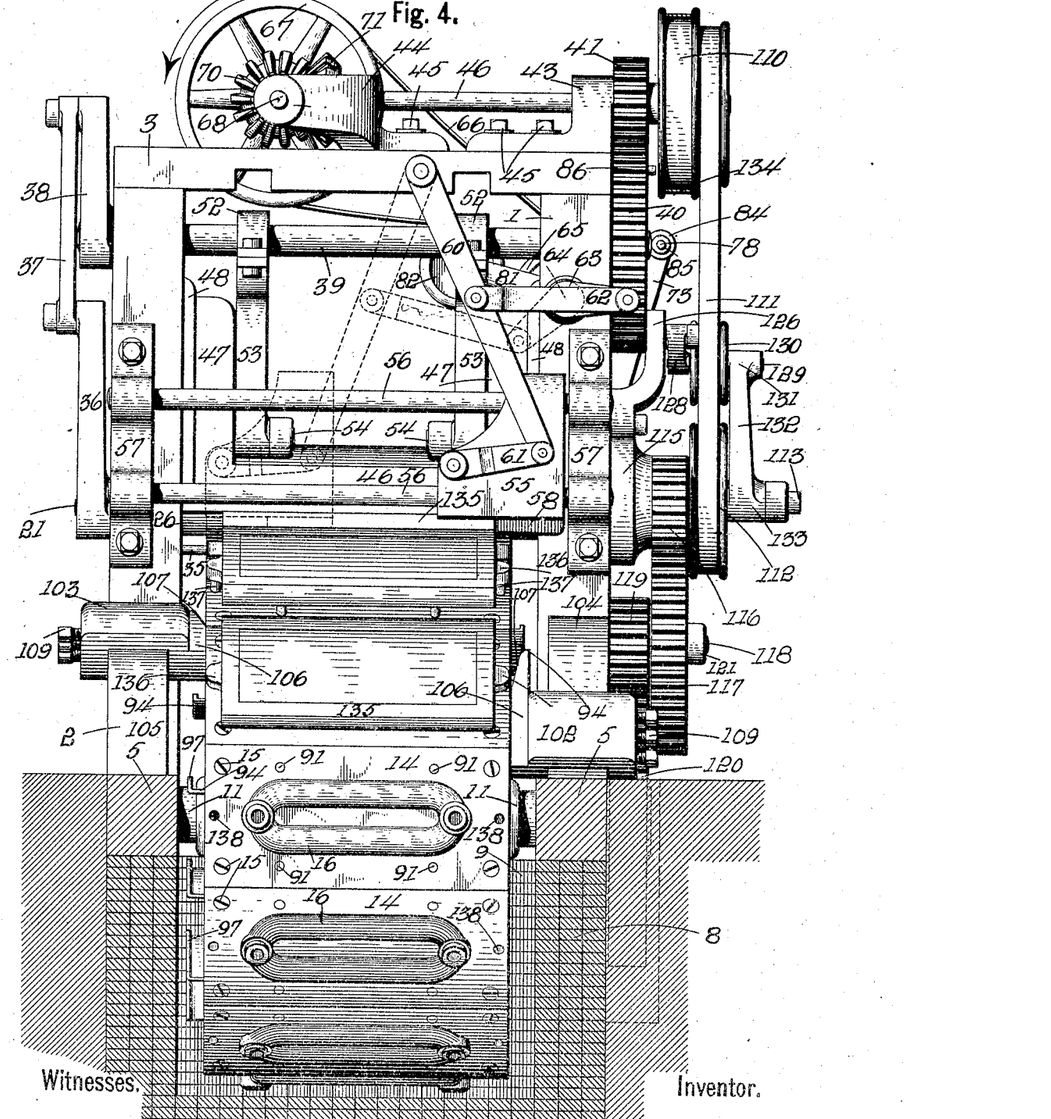
Fig. 4 is a rear elevation of the machine.
Figure 7:
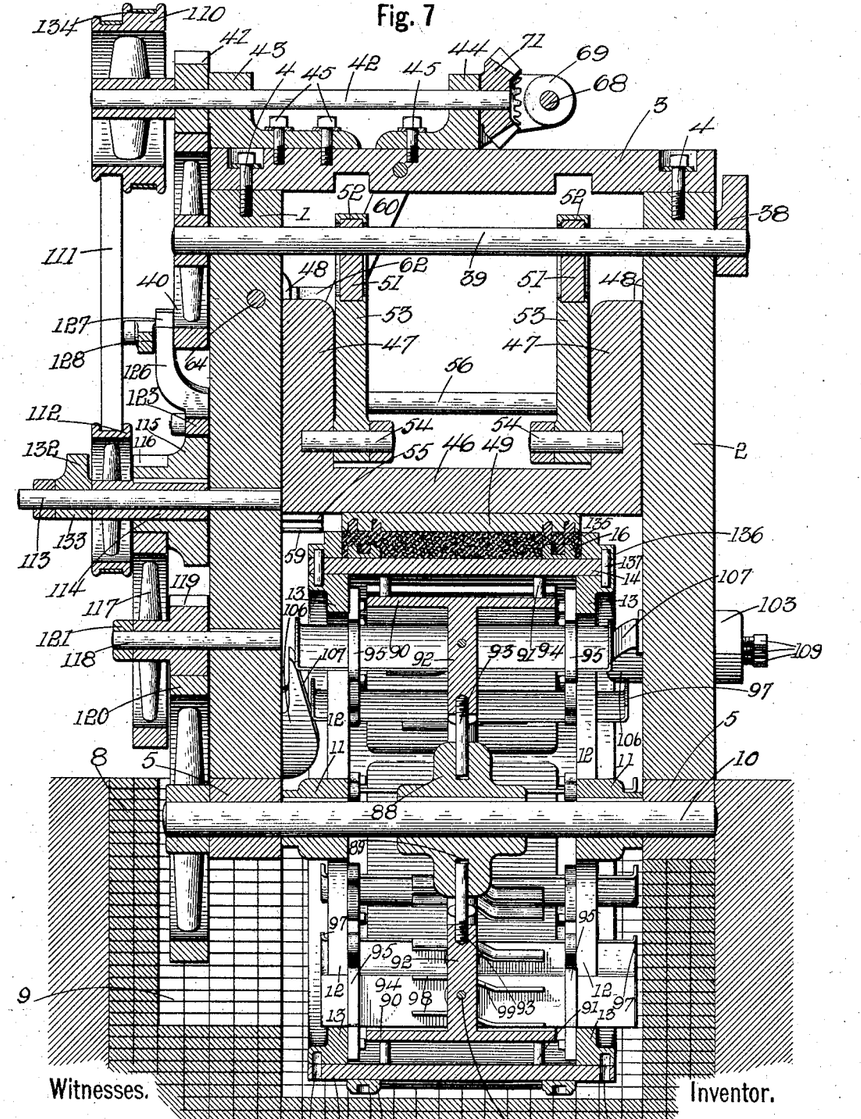

*Means for intermittently operating the flask-supporting wheel.*—The mechanism for intermittently operating the wheel carrying the patterns is illustrated in Figs. 1, 3, 4, 7, and 23. The driving-shaft 42 has a double-faced pulley 110 keyed to one end thereof, and a belt 111 connects the outer face of the pulley 110 with a pulley 112, which is loosely mounted upon a horizontal shaft or bar 113. The shaft or bar 113 extends outwardly from the side frame member 1 and is securely fastened thereto by a key. (See Fig. 7.) The pulley 112 is provided with an elongated hub 114, and a cam-wheel 115 is securely fastened to the hub 114 by a key, so as to rotate in unison with the pulley 112. The cam-wheel 115 has a pinion 116 formed integral therewith, which meshes with a gear-wheel 117, loosely mounted on a lower horizontal shaft or bar 118. The shaft or bar 118 is rigidly keyed or fastened to the side frame member 1 and extends outwardly therefrom. The gear-wheel 117 has a pinion 119 formed integral therewith, which meshes with a gear-wheel 120, keyed to one end of the shaft 10, the gear-wheel 117 and pinion 119 being prevented from longitudinal displacement from the shaft or bar 118 by a collar 121. (See Fig. 7.) The cam-wheel 115 is placed on the hub 114 of the pulley 112, so as to be adjacent to the side frame member 1, and an angular cam-locking crank is pivoted to the side frame member 1. The angular cam-locking crank has its lower arm 123 provided with a downwardly-extending lug 124, which is adapted to seat in a depression 125, formed in the face of the cam-wheel 115. (See Figs. 3 and 23.) The upper arm 126 of the angular cam-locking crank is curved outwardly, as shown in Figs. 3, 4, and 7, and extends upwardly and past the lower portion of the gear-wheel 40 and has its upper end beveled at 127. A connecting-rod 128 has one end pivoted to the upper end of the upper arm 126 of the angular cam-locking crank and its opposite end pivoted to the inner end of a pin 129, upon which a pulley 130 is loosely mounted. The pin 129 extends inwardly from the upper hub 131 of an upwardly-extending arm 132. The arm 132 is provided at its lower end with a hub 133, loosely mounted upon the shaft or bar 113 and adjacent to the pulley 112. (See Figs. 1, 3, 4, and 7.) The belt 111 passes around the outer face of the pulley 110, the pulley 112, and the rear portion of the pulley 130, as shown in Fig 1. The angular cam-locking crank is operated by the pin 86, which strikes the beveled upper end 127 of the upper arm 126 and rocks the angular cam-locking crank on its pivot-pin 122 and withdraws the lug 124 from the depression 125 in the cam-wheel 115. At the same time the arm 132 is drawn backward by means of the connecting-rod 128, thus tightening the belt 111 around the pulleys 110 and 112 and causing the pulley 112 to revolve. This motion is transmitted to the main shaft 10 by means of the pinion 116, gear-wheel 117, pinion 119, and gear-wheel 120. These pinions and gear-wheels are so proportioned that one complete revolution of the pinion 115 will cause the intermittently-rotating wheel to move one step forward in the direction shown by the arrow in Figs. 1 and 2. The angular cam-locking crank is prevented from moving forward after the pin 86 has passed by the end of the upper arm 126 by the lug 124, which slides on the surface of the cam-wheel 115 as the wheel revolves and keeps the belt 111 in a taut condition until the cam-wheel 115 has made a complete revolution. When the cam-wheel 115 has made one complete revolution, the lug 124 drops into the depression 125, thereby moving the upper arm 126 forward and by means of the connecting-rod 128 moving the arm 132 forward and loosening the belt 111, which stops the rotation of the pulley 112. The driving-shaft 42 is rotated by means of a belt 134, which passes around the inner face of the pulley 110 and is connected at its other end to any suitable source of power.

The preferred form of flask used with this machine is illustrated in Figs. 1, 2, 3, 4, 5, 6, and 7 and consists of a rectangular frame 135, the ends of which are provided with outwardly-extending lugs 136. These lugs 136 are provided with short downwardly-extending pins 137, which fit in sockets or depressions 138, formed in the plates or blocks 14, and serve to keep the flask 135 in position. (See Fig. 7.)

Operation: The operation of the machine is as follows: A flask 135 is placed in position upon the plate 14 on the front of the intermittently-rotating wheel, the position of the plate 14, upon which the flask 135 is placed, being indicated by the letter A in Figs. 1, 2, 5, and 6. The flask 135 is so placed upon the plate 14 that the pins 137, extending from the lugs 136 on the flask, fit in the depressions or sockets 138 in the plates 14. (See Fig. 7.) When the flask 135 has been placed in position, as above described, the pin 86, projecting from the lug 87 on the gear-wheel 40, strikes the beveled upper end 127 of the upper arm 126 of the angular cam-locking crank and rocks the crank upon its pivoting-pin 121. This withdraws the lug 124 on the lower arm 123 of the cam-locking crank from the depression 125 in the face of the cam-wheel 115. The rocking of the angular cam-locking crank also draws back the arm 132 by means of the connecting-rod 128 and tightens the belt 111 around the pulleys 110 and 112 by means of the small pulley 130. This causes the pulley 112 to revolve and by means of the pinions 116 and 119 and gear-wheels 117 and 120 moves the intermittently-rotating wheel one step forward, as heretofore described. When the pulley 112 has made a complete revolution, the lug 124 drops into the depression 125 on the cam-wheel 115, thus moving the arm 132 forward and loosening the belt 111, which stops the rotation of the intermittently-rotating wheel. This movement of the intermittently-rotating wheel brings the flask 135 beneath the false flask 19, where they are filled with sand from the chute 17. After the flask 135 and false flask 19 have been filled with sand the platen 25 is moved downwardly by means of the crank 36 on the rock-shaft 21, connecting-rod 37, and the crank 38 on the horizontal shaft 39, as heretofore described. As the platen 25 moves downwardly the side flange 27 and end flanges 28 on the platen 25 press or condense the sand adjacent to the inside of the flask 135, as shown in Fig. 8. As the platen 25 moves downwardly the outer end of the plate 29 is forced outwardly by the flange 24 on the end of the false flask 19 until the platen 25 has reached its lowest position, when the extension 30 on the outer end of the plate 29 catches upon the bottom surface of the end flange 24. As the platen 25 moves upward the false flask 19 is carried with it and the intermittently-rotating wheel moves one step farther, which brings the flask 135 beneath the finishing sand-pressing mechanism. When the flask 135 has passed from beneath the false flask 19, the false flask is released from the platen 25 by means of the inner lug 31, which slides upon the curved inner surface 34 of the portion 33 on the bearing-block 22, as heretofore described. The finishing-platen 49 is operated by means of the eccentrics 51, mounted on the shaft 39, which move the cross-head carrying the platen 49 downwardly and firmly press or condense the sand in the flask 135. (See Fig. 8.) As the finishing-platen 49 moves upwardly the sand-scraping device is moved across the top of the flask 135 and removes the superfluous sand therefrom. The pin 86 strikes the roller 84, and thereby withdrawing the extension 76 from the depression 72 and forcing the bar 73 outwardly, also rocking the sleeve 80 by means of the connecting-rod 77 and crank-arm 79. The rocking of the sleeve 80 lifts the crank-arm 81 and forces the pulley 82 against the lower portion of the belt 66, thereby tightening the same and causing the pulley 65 and shaft 64 to rotate. The rotation of the shaft 64 operates the crank 63 and by means of the connecting-rod 62 imparts a swinging movement to the arm 60. The movement of the arm 60 causes the slide-block 55 to move horizontally on the guide-rods 56, and thereby move the portion 59 of the plate 58 across the top of the flask 135 and scraping the superfluous sand therefrom. When the shaft 64 has made a complete revolution, the extension 76 seats in the depression 72 in the flange of the pulley 65 and stops the rotation of said pulley. After the superfluous sand has been removed from the flask 133 the intermittently-rotating wheel makes a partial rotation, which lifts the flask from the pattern, as shown in Figs. 3, 7, 8, and 9. As the intermittently-rotating wheel rotates the bent end 97 of the sliding cam-plate 94, which is beneath the flask from which the superfluous sand has been removed, strikes the curved outer surface 107 of the cam-block 103. The movement of the wheel and the curved shape of the cam-block 103 causes the bent end 97 to move inwardly, as shown in dotted lines in Fig. 9. The movement of the plate 94 moves the plate 90 and block 92 upwardly by means of the roller 100, which is moved by the flanges 98 on the cam-plate 94. The upward movement of the plate 90 lifts the flask 135 from the pattern by means of the pins 91. (See Fig. 8.) The intermittently-rotating wheel now makes another partial rotation, and the flask 135 is removed by hand from the plate 14 at the point marked B in Figs. 1, 2, and 4. The next partial rotation of the wheel causes the opposite end 97 of the cam-plate 94 to strike the curved surface 107 of the cam-block 102 and move back to its original position, thereby returning the plate 90, pins 91, and block 92 to the position shown in full lines in Fig. 9.

It will be seen by referring to the drawings that there will be five flasks upon the wheel at all times, for as soon as one flask is removed at the rear end of the machine an empty flask is placed in position at the front of the machine.

One of the advantages of the form of wheel shown is that the sand which falls or is scraped from the flask onto the patterns and plates 14 drops off as the wheel rotates into the pit 9 and leaves the pattern clean, thereby dispensing with the auxiliary mechanisms, as a blower or brush, required for cleaning the type of molding-machines provided with horizontal flask-supporting tables.

I claim as my invention—

1. In a molding-machine, a frame, and a flask-supporting wheel journaled in said frame and composed of a center shaft, a plurality of rings, spokes extending from the shaft to the rings, and a series of segmental blocks mounted on the rings, flasks supported on said blocks, mold-forming mechanism, and means for lifting the flasks from the blocks; said means being operated from the center shaft.

2. In a molding-machine, a frame, and a flask-supporting wheel journaled in said frame and composed of a center shaft, a plurality of rings, spokes extending from the shaft to the rings, and a series of segmental blocks mounted on the rings and having flat outer surfaces and transverse openings, flasks supported on said flat surfaces, mold-forming mechanism and means for lifting the flasks from said surfaces including pins extending through the transverse openings.

3. In a molding-machine, a wheel having a comparatively wide tread or periphery composed of a series of segments each of which is adapted to support a flask and pattern and a center shaft and means operated from the center shaft for lifting the flask from the pattern at a predetermined point in the rotation of the wheel.

4. In a molding-machine, a wheel having a comparatively wide tread or periphery composed of a series of segments each of which has a flat outer surface and is adapted to support a flask and pattern and a center shaft and means within the wheel and operated from the center shaft for lifting the flask from the pattern at a predetermined point in the rotation of the wheel.

5. In a molding-machine, a frame, a wheel having a plurality of segments provided with flat peripheral surfaces adapted to support flasks and patterns and a false flask having support from the frame and adapted to swing down upon a flask on the wheel.

6. In a molding-machine, a frame, a wheel having a peripheral flask-supporting surface, and a false flask having support from the frame and adapted to swing down upon a flask on the wheel.

7. In a molding-machine, a frame, a wheel having a peripheral flask-supporting surface, and a false flask having support from the frame and adapted to swing down upon a flask on the wheel; said false flask having an upwardly-extending flange.

8. In a molding-machine, a frame, a wheel having a peripheral flask-supporting surface and a false flask having support from the frame and adapted to swing down upon a flask on the wheel; said false flask having an upwardly-extending flange and an outwardly-extending flange at each end.

9. In a molding-machine, a frame, a wheel having a peripheral flask-supporting surface, a false flask having support from the frame and adapted to swing down upon a flask on the wheel, a sand-pressing device and a latch adapted to temporarily lock the sand-pressing device to the false flask.

10. In a molding-machine, a frame, a wheel having a peripheral flask-supporting surface, a false flask having support from the frame and adapted to swing down upon a flask on the wheel, a sand-pressing device, and a plate pivoted to the sand-pressing device and having a hook portion adapted to catch upon the false flask.

11. In a molding-machine, a frame, a wheel having a peripheral flask-supporting surface, a false flask having support from the frame and adapted to swing down upon a flask on the wheel; said false flask having a rectangular opening, and a sand-pressing device having a series of rectangularly-arranged depending flanges adapted to fit in the opening in the false flask.

12. In a molding-machine, a frame, a flask-supporting wheel, a rock-shaft journaled in the frame, a false flask having ears loose on said rock-shaft, a sand-pressing device rigid on said rock-shaft, and means for rocking said shaft.

13. In a molding-machine, a frame, a flask-supporting wheel, a rock-shaft journaled in the frame, a false flask having ears loose on said rock-shaft, a sand-pressing device rigid on said rock-shaft, a latching device for temporarily locking the sand-pressing device to the false flask, and means for rocking said shaft.

14. In a molding-machine, a frame, a flask-supporting wheel, a rock-shaft journaled in the frame, a false flask having ears loose on said rock-shaft, a sand-pressing device rigid on said rock-shaft, a latching device for temporarily locking the sand-pressing device to the false flask, means for moving said latching device to release said false flask, and means for rocking said shaft.

15. In a molding-machine, a flask-supporting element, a false flask above the flask-supporting element, a sand-pressing device having means for elevating said false flask and means for releasing said elevating means to permit the false flask to drop by gravity.

16. In a molding-machine, a frame, a flask-supporting wheel, a rock-shaft journaled in the frame, a false flask loosely pivoted on said rock-shaft, a sand-pressing device rigid on said rock-shaft, means for temporarily locking the sand-pressing device to the false flask, and means for rocking said shaft.

17. In a molding-machine, an upright frame, a flask-supporting wheel journaled in said frame, sand-pressing means mounted in the frame above the wheel, a rod mounted in the frame and a reciprocating scraper consisting of a block slidably mounted on said rod and a scraping-plate secured to said block.

18. In a molding-machine, a frame, a flask-supporting element, a sand-pressing device, a rod attached to the frame, a scraping device slidably mounted on said rod and means for reciprocating said scraping device on said rod.

19. In a molding-machine, an upright frame, a flask-supporting wheel journaled in said frame, sand-pressing means mounted in the frame above the wheel, a rod attached to the frame and a reciprocating scraper slidably supported by the rod on one side of the sand-pressing means.

20. In a molding-machine, an upright frame, a flask-supporting wheel journaled in said frame, sand-pressing means mounted in the frame above the wheel, a scraper supported by the frame on one side of the sand-pressing means and means for laterally reciprocating said scraper across the periphery of said flask-supporting wheel.

21. In a molding-machine, an upright frame, a flask-supporting wheel journaled in said frame, sand-pressing means mounted in the frame above the wheel, a rod mounted in the frame and a reciprocating scraper slidably mounted on said rod.

22. In a molding-machine, an upright frame, a flask-supporting wheel journaled in said frame, sand-pressing means mounted in the frame above the wheel, a plurality of rods in said frame and a reciprocating scraper slidably mounted on said rods.

23. In a molding-machine, an upright frame, a flask-supporting wheel journaled in said frame, sand-pressing means mounted in the frame above the wheel, two parallel horizontal rods in said frame and a reciprocating scraper slidably mounted on said rods.

24. In a molding-machine, a frame, a horizontal shaft journaled in said frame, a rotatable flask-supporting wheel on said shaft, sand-pressing mechanism having support by the frame above the wheel, and automatic mechanism located within the wheel and operated from the shaft for lifting the flasks from said wheel and consisting at least in part of a series of plates within the wheel having flask-lifting pins projecting through openings in the wheel and means for moving said plates.

25. In a molding-machine, a frame, a horizontal shaft journaled in said frame, a rotatable flask-supporting wheel on said shaft, sand-pressing mechanism having support by the frame above the wheel, and automatic mechanism located within the wheel and operated from the shaft for lifting the flasks from said wheel, and consisting at least in part of a hub on the horizontal shaft, of the wheel provided with a series of radial sockets, a plurality of plates having lifting-pins and supporting-bars slidably fitting in the sockets in the hubs, and means for successively moving said plates at a predetermined point in the rotation of the wheel.

26. In a molding-machine, a frame, a horizontal shaft journaled in said frame, a rotatable wheel on said shaft having a peripheral series of flask-supporting segments, flasks supported on said segments, mold-forming mechanism, a plurality of flask-lifting mechanisms and means for successively operating said flask-lifting mechanisms at a predetermined point in the rotation of the wheel and directly after the mold-forming mechanism has coacted with the flasks to form molds.

27. In a molding-machine, a frame, a horizontal shaft journaled in said frame, a rotatable wheel on said shaft having a peripheral series of flask-supporting segments, flasks supported on said segments, mold-forming mechanism, a plurality of flask-lifting mechanisms, each including a sliding plate and lifting-pins, and means for successively operating said flask-lifting mechanisms at a predetermined point in the rotation of the wheel and directly after the mold-forming mechanism has coacted with the flasks to form molds.

28. In a molding-machine, a frame, a flask-supporting wheel in said frame, means for rotating said wheel, a main pressing mechanism in the frame above the wheel, a preliminary pressing mechanism having support from the frame on one side of the main pressing mechanism, and a scraping mechanism having support from the frame on the opposite side of the main pressing mechanism.

29. In a molding-machine, a frame, a flask-supporting wheel in said frame, means for intermittently rotating said wheel, a main pressing mechanism in the frame above the wheel, a preliminary pressing mechanism having support from the frame on one side of the main pressing mechanism, a scraping mechanism having support from the frame on the opposite side of the main pressing mechanism, and means for operating the main pressing mechanism, the preliminary pressing mechanism and the scraping mechanism during the intermission of movement of the flask-supporting wheel.

GEORGE H. CAMPBELL.

Witnesses:
L. M. SANGSTER,
GEO. A. NEUBAUER.